US012058262B2

(12) United States Patent
Ramanujan et al.

(10) Patent No.: US 12,058,262 B2
(45) Date of Patent: *Aug. 6, 2024

(54) SOFTWARE CREDENTIAL TOKEN PROCESS, SOFTWARE, AND DEVICE

(71) Applicant: ARCHITECTURE TECHNOLOGY CORPORATION, Eden Prairie, MN (US)

(72) Inventors: Ranga S. Ramanujan, Medina, MN (US); Deborah K. Charan, Minneapolis, MN (US); Barry A. Trent, Chanhassen, MN (US); Jordan C. Bonney, Bloomington, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/145,841

(22) Filed: Dec. 22, 2022

(65) Prior Publication Data

US 2023/0179420 A1 Jun. 8, 2023

Related U.S. Application Data

(63) Continuation of application No. 16/946,940, filed on Jul. 13, 2020, now Pat. No. 11,539,524, which is a
(Continued)

(51) Int. Cl.
*H04L 9/00* (2022.01)
*H04L 9/32* (2006.01)
*H04L 9/40* (2022.01)

(52) U.S. Cl.
CPC .......... *H04L 9/3213* (2013.01); *H04L 9/3228* (2013.01); *H04L 9/3234* (2013.01); *H04L 9/3263* (2013.01); *H04L 63/083* (2013.01)

(58) Field of Classification Search
CPC ... H04L 63/083; H04L 9/3263; H04L 9/3234; H04L 9/3228; H04L 9/3213
(Continued)

(56) References Cited

U.S. PATENT DOCUMENTS 8,032,932 B2 10/2011 Speyer et al.
9,258,111 B2 * 2/2016 Lee ...................... H04L 9/0897
(Continued)

OTHER PUBLICATIONS

"Guidelines for Derived Personal Identity Verification (PIV) Credentials", National Institute of Standards and Technology, Dec. 2014, pp. 1-33, USA.
(Continued)

*Primary Examiner* — Josnel Jeudy
(74) *Attorney, Agent, or Firm* — Carlson, Caspers, Vandenburgh & Lindquist, P.A.

(57) ABSTRACT

Embodiments for a computer readable medium including a software module are provided. The software module causes one or more processing devices to obtain a biometric identifier from a user. Access to a resource is requested by providing a software credential token and the biometric identifier. The software credential token corresponds to a hardware credential token, and the hardware credential token is one of a set of hardware credential tokens that are used to access the resource. An indication that access to the resource has been granted is received and after receiving the indication an indication that the access to the resource has been revoked is received. After receiving the indication that access to the resource has been revoked, a biometric identifier is re-obtained from a user and access to the resource is re-requested by providing a software credential token and the re-obtained biometric identifier.

26 Claims, 7 Drawing Sheets

Related U.S. Application Data continuation of application No. 15/992,924, filed on May 30, 2018, now Pat. No. 10,715,327.

(58) Field of Classification Search
USPC .......................................................... 713/159
See application file for complete search history.

(56) References Cited

U.S. PATENT DOCUMENTS

| | | | |
|---|---|---|---|
| 10,505,925 B1 | 12/2019 | Doloff | |
| 2003/0204726 A1* | 10/2003 | Kefford | H04L 63/18 713/171 |
| 2007/0079136 A1 | 4/2007 | Vishik et al. | |
| 2011/0296172 A1* | 12/2011 | Fu | H04L 63/062 713/156 |
| 2012/0137128 A1 | 5/2012 | Buer | |
| 2014/0337955 A1 | 11/2014 | Mendelovich et al. | |
| 2016/0127365 A1 | 5/2016 | Bares et al. | |
| 2017/0134354 A1 | 5/2017 | Anand et al. | |
| 2017/0171183 A1* | 6/2017 | Lingappa | H04L 63/0435 |
| 2017/0220793 A1 | 8/2017 | Birgisson et al. | |
| 2018/0341758 A1* | 11/2018 | Park | G06F 21/316 |
| 2019/0208421 A1* | 7/2019 | Ziraknejad | H04L 9/0825 |
| 2020/0153831 A1 | 5/2020 | Baer et al. | |
| 2023/0139222 A1* | 5/2023 | Jen | H04L 63/0478 |

OTHER PUBLICATIONS

"How to configure Centrify Identity Services issued derived credentials", Centrify Corporation, https://docs.centrify.com/en/centrify/adminref/index.html#/page/cloudhelp/derivedCreds.html, pp. 1-3, Accessed via the Internet on May 23, 2018.

U.S. Patent and Trademark Office, "Notice of Allowance", U.S. Appl. No. 15/992,924, filed May 28, 2020, 8 pgs.

U.S. Patent and Trademark Office, "Notice of Allowance", U.S. Appl. No. 16/946,940, filed Aug. 31, 2022, 9 pgs.

U.S. Patent and Trademark Office, "Office Action", U.S. Appl. No. 15/992,924, filed Dec. 27, 2019, pp. 1-6.

U.S. Patent and Trademark Office, "Office Action", U.S. Appl. No. 16/946,940, filed Mar. 16, 2022, 8 pgs.

* cited by examiner

SOFTWARE CREDENTIAL TOKEN PROCESS, SOFTWARE, AND DEVICE

RELATED APPLICATIONS

This application is a continuation of U.S. patent application Ser. No. 16/946,940 filed on Jul. 13, 2020, entitled "SOFTWARE CREDENTIAL TOKEN PROCESS, SOFTWARE, AND DEVICE", now U.S. Pat. No. 11,539,524 issued Dec. 27, 2022, which is a continuation of U.S. patent application Ser. No. 15/992,924 filed on May 30, 2018, entitled "SOFTWARE CREDENTIAL TOKEN ISSUANCE BASED ON HARDWARE CREDENTIAL TOKEN", issued as U.S. Pat. No. 10,715,327, the contents of which are hereby incorporated herein by reference.

GOVERNMENT CONTRACTS

This invention was made with government support under contract N68335-18-00125 awarded by the Naval Air Warfare Center. The government may have certain rights in the invention.

BACKGROUND

Some online resources, such as email accounts (e.g., federal/military) and organization portals (e.g., federal/military), rely on hardware credential tokens to restrict/grant access thereto. The hardware credential tokens can take the form of a smartcard or other physical device and also act as an identity credential for an individual. In order to use the hardware credential token to access the resource, a user must possess the hardware credential token and have access to a device that can read the hardware credential token. Because a hardware credential token requires physical possession, typically along with a known secret (e.g., a PIN), a hardware credential token can provide strong authentication of an individual. As more and more users get accustomed to immediate and constant access to the internet through their mobile devices, however, relying on a hardware credential token for access to an online resource may inconvenience users, as most mobile devices cannot read a hardware credential token without an external accessory device coupled to the mobile device.

BRIEF DESCRIPTION

Embodiments for a non-transitory computer readable medium including a software module are provided. The software module, when executed by one or more processing devices, causes the one or more processing devices to obtain a biometric identifier from a user. Access to a resource is requested by providing a software credential token and the biometric identifier. The software credential token corresponds to a hardware credential token, and the hardware credential token is one of a set of hardware credential tokens that are used to access the resource. An indication that access to the resource has been granted is received and after receiving the indication an indication that the access to the resource has been revoked is received. After receiving the indication that access to the resource has been revoked, a biometric identifier is re-obtained from a user and access to the resource is re-requested by providing a software credential token and the re-obtained biometric identifier.

Embodiments for a method are also provided. The method includes obtaining, at a mobile device, a biometric identifier from a user and requesting, from the mobile device, access to a resource by providing a software credential token and the biometric identifier. The software credential token corresponds to a hardware credential token and the hardware credential token one of a set of hardware credential tokens that are used to access the resource. The method also includes receiving, at the mobile device, an indication that access to the resource has been granted. After receiving the indication that access to the resource has been granted, an indication is received at the mobile device that the access to the resource has been revoked. After receiving the indication that access to the resource has been revoked, the method includes re-obtaining, at the mobile device, a biometric identifier from a user, and re-requesting, from the mobile device, access to the resource by providing a software credential token and the re-obtained biometric identifier.

Embodiments for a mobile device having a one or more processing devices and a storage media including instructions are also provided. The instructions, when executed by one or more processing devices, causes the one or more processing devices to obtain a biometric identifier from a user. Access to a resource is requested by providing a software credential token and the biometric identifier. The software credential token corresponds to a hardware credential token, and the hardware credential token is one of a set of hardware credential tokens that are used to access the resource. An indication that access to the resource has been granted is received and after receiving the indication an indication that the access to the resource has been revoked is received. After receiving the indication that access to the resource has been revoked, a biometric identifier is re-obtained from a user and access to the resource is re-requested by providing a software credential token and the re-obtained biometric identifier.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

One solution to the inconvenience of hardware credential token use would be to make access to the online resource hinge on something other than a hardware credential token, such as a software credential token which can be stored on the mobile device. While this may solve the hardware credential token inconvenience for new users to the online resource, there is still the challenge of how to ensure that the software credential token provides credential strength comparable to the hardware credential token before users transition to the former from the latter. In particular, it is desirable if the transition from a hardware credential token to a software credential token maintains a high level of assurance, ensuring that only users actually issued a hardware credential token are provided a software credential token. Additionally, it is desirable if the transition is convenient and familiar to the user, enabling the user to complete the transition in a smooth and comfortable manner.

Figure 1:
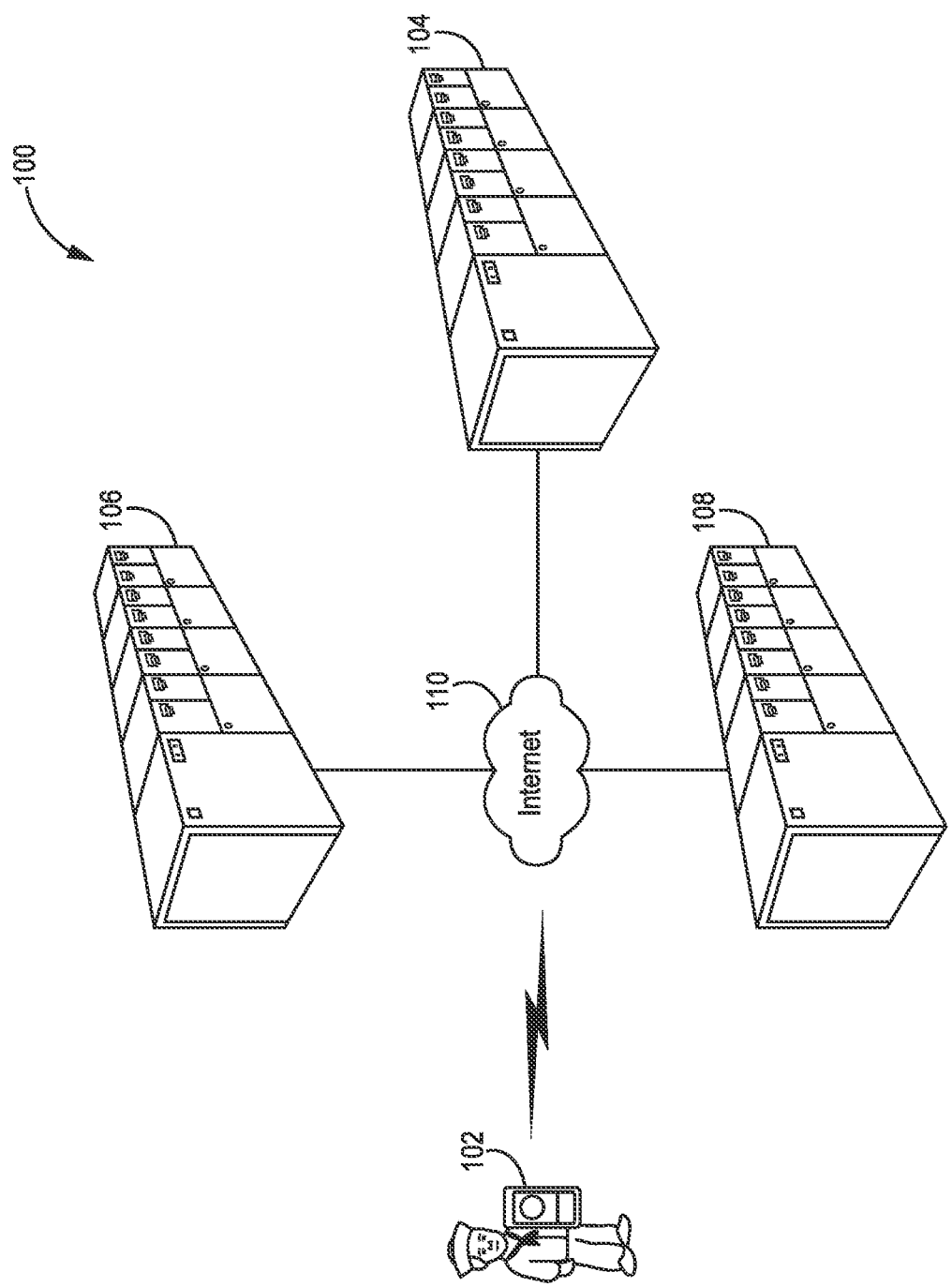
FIG. 1 is an illustration of an example system for securely issuing a software credential token to a user based on a hardware credential token.

FIG. 1 is a block diagram of an example system 100 for issuing and using software credential tokens for users having an existing hardware credential token. The system 100 includes a data server 104 housing the online resource to which access is restricted. The system 100 also includes an authentication server 106, which issues software credential tokens to users and manages user authentication via the software credential token for access to the data server 104. The system 100 can also include a key server 108 that stores public keys for encrypting emails sent to the users with corresponding hardware credential tokens. The users with the corresponding hardware credential tokens can then decrypt the e-mail using the private key stored on their hardware credential token. The user's rightful possession of this hardware credential token is also used for accessing the online resource/data server 104. The system 100 also includes a plurality of personal computing devices 102. The subject matter described herein, enables the personal computing device(s) 102 to be used with a valid software credential token as another means for a user to access the data server 104. The computing device(s) 102, data server 104, authentication server 106, and key server 108 are communicatively coupled together over one or more networks 110, such as the Internet.

Any suitable personal computing devices can be used. Example computing devices include a mobile device, laptop, smart speaker, a desktop computer, and an integrated computer (e.g., a computer integrated into a vehicle). Example mobile devices include a mobile phone, tablet, and a wearable device (e.g., smart watch, smart glass, etc.). Through the use of a valid software credential token, a user can access the data server 104 via their computing device 102 to display, store, and otherwise manipulate the data stored thereon.

The data server 104 is one or more information systems that store data to be accessed over a network (e.g., the Internet 110). The computing device 102 can be coupled to the data server 104 over one or more networks 110, such as the Internet. The data server 104 can restrict access to data stored thereon, such that only authorized individuals can access data. The data server 104 can provide a portal for access to the data via a web browser and can provide an application programming interface (API) for access via a mobile application (app) executing on the mobile device 102. The portal can verify the authenticity and authorization of an individual attempting to access data therein by requiring that a hardware credential token be possessed by the individual accessing the portal. One or more second factors can also be required, such as user input of a secret character string (e.g., PIN) that is encoded into the hardware credential token.

As known, a hardware credential token is a physical device having embedded information therein that allows a user to gain access to an electronically restricted resource. The hardware credential token can communicate with (e.g., via near-field communication (NFC), Bluetooth (e.g., Bluetooth Low Energy (BLE))), and/or be coupled to, another electronic device to extract information therefrom and validate that the possessor of the hardware credential token should be given access to the electronically restricted resource. In the example described herein, the electronically restricted resource is an online resource. The hardware credential token is typically small enough to easily fit in a hand of an individual and can have any suitable form factor, such as a USB dongle, a smartcard (e.g., a credit card like structure with an integrated circuit chip (ICC) embedded therein), SIM card, universal integrated circuit card (UICC), SD card (e.g., microSD card), or other hardware form. A public key infrastructure (PKI) digital certificate can be stored (e.g., permanently stored/burnt) into the hardware device (e.g., into memory of the USB dongle, or the ICC of the smartcard). Specific examples of a hardware credential token include the common access card (CAC) issued by the U.S. military and the personal identity verification (PIV) card issued by federal agencies of the U.S. In any case, the hardware credential token is typically a distinct device from the personal computing device 102.

Multiple hardware credential tokens can be issued, one for each user desiring access to the data server 104. Each user can have a distinct hardware credential token. Collectively, there can be a set of hardware credential tokens that allow access to the data server 104, wherein the set of hardware credential tokens correspond to a set of users authorized to access the data server 104.

The software credential token can provide another means—an alternative to the hardware credential token—for an individual to access the data server 104. As should be understood, multiple personal computing devices 102 for multiple users may be deployed, such that each of the multiple users can access data on the data server 104 via a respective computing device 102. A mobile application (app) or other software module can execute on the computing device 102 to perform the functions of the computing device 102 described herein.

The authentication server 106 can manage access to data server 104 via the computing device(s) 102. The authentication server 106 is one or more information servers and can be a common server(s) with the data server 104 or a distinct server(s) therefrom. The authentication server 106 can be coupled to the computing device(s) 102 and the data server 104 over one or more networks 110, such as the Internet. The authentication server 106 can manage access to the data server 104 by authenticating users of the computing device(s) 102 to enable access to data of the data server 104 to those users who are authorized to access that data.

The key server 108 is one or more information servers that store public keys corresponding to hardware credential tokens used to access the data server 104. Each public key can be the public key in an asymmetric public/private key pair, wherein the corresponding private key is contained within one of the set of hardware credential tokens issued to a user that is authorized to access the data server 104. Accordingly, each public key can be used to encrypt data, such as e-mail, that can only be decrypted with the corresponding hardware credential token.

Figure 2:
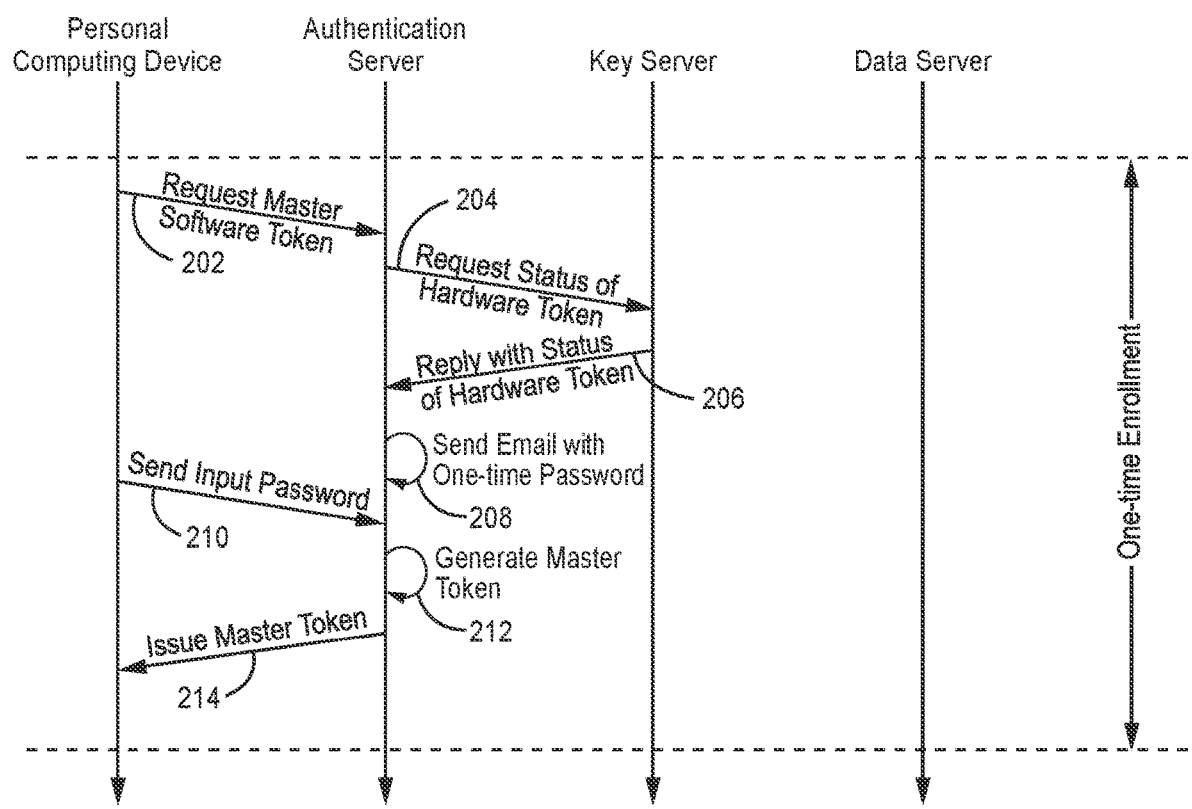
FIG. 2 is a message flow diagram illustrating an example method of issuing the software credential token to the user of FIG. 1.
Figure 3:
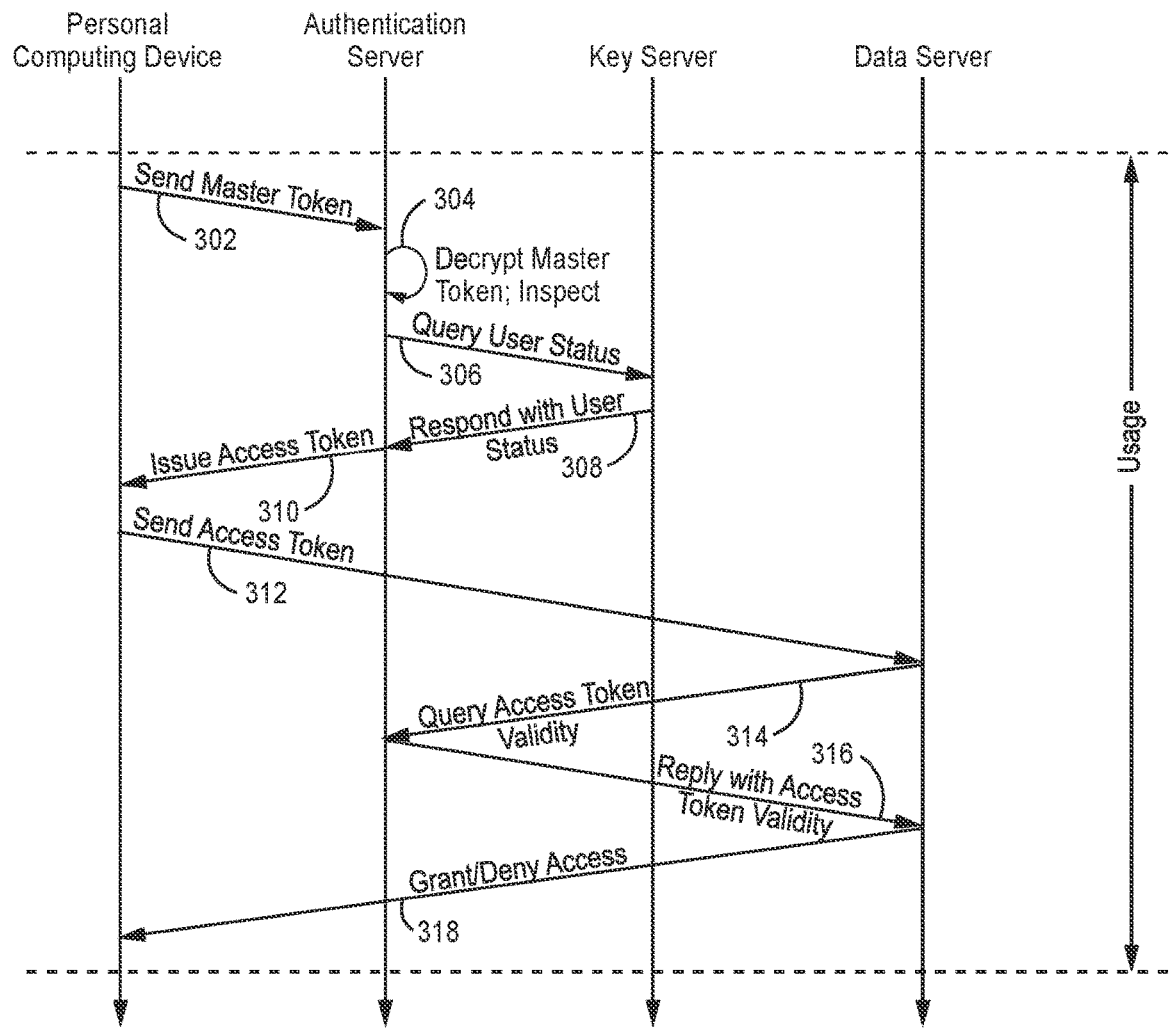
FIG. 3 is a message flow diagram illustrating an example method of using the software credential token

FIGS. 2 and 3 are respective message flow diagrams of an example method 200 for issuing a software credential token to a user (FIG. 2) and a method 300 of using a software credential token to access the data server 104 (FIG. 3) after the software credential token is issued. Both the issuance of the software credential token (200) and the subsequent use of the software credential token to access the data server 104 (300) occur via the personal computing device 102.

The software credential token is intended as an alternative credential to the hardware credential token for authenticating a user for access to the online resource/data server 104. Thus, the software credential token is possessed by the user and presented in order to authenticate the user for access to the data server 104. The process 300 of presenting the software credential token, verifying its validity, and granting access to the data server 104 is the use of the software credential token described with reference to FIG. 3. Before a user can use a software credential token, however, the user must be issued a software credential token. The process 200 of issuing a software credential token is described with respect to FIG. 2.

Issuance of the software credential token (200) occurs once, or at most infrequently, and is done upon the reliance of a hardware credential token possessed by a user. Issuance of the software credential token (200) can begin with loading software (e.g., the appropriate app) onto the personal computing device 102. The software credential token can be used with any appropriate software on the personal computing device 102. In an example, the software credential token is used in conjunction with a web browser (e.g., Chrome, Edge, Firefox, Safari) to access data on the data server 104. In another example, the software credential token is used in conjunction with a mobile application (app) on a mobile device. Other software modules can also be used to provide the functionality described herein for the computing device 102. In any case, if the software does not already exist on the personal computing device 102, the software can be loaded onto the computing device 102, for example, by downloading the software to the computing device 102 over the internet and installing the software on the device 102.

The software credential token is issued by the authentication server 106. The authentication server 106 identifies a user corresponding to the computing device 102 and authenticates that user via their hardware credential token prior to issuing the user a software credential token. This process 200 of software credential token issuance attempts to ensure that a user corresponding to a computing device 102 possesses a valid hardware credential token, which would enable the user to access data on the data server 104. Successful software credential token issuance results in a software credential token being issued to the computing device 102. The software credential token can then be used for subsequent "session authentications" (method 300) of the user.

In an example, the computing device 102 identifies that no software credential token is accessible to it (e.g., upon initial startup/set-up of the computing device 102 or the appropriate app/software module executing thereon) and automatically initiates the process of acquiring a software credential token for the user in response. Software credential token acquisition begins with the computing device 102 prompting a user for identifying information corresponding to their hardware credential token, such as an email address and name that is linked to their hardware credential token. In an example, the hardware credential token of a user can be linked to an email account of the user (e.g., a .mil email account) and the computing device 102 can prompt the user for their .mil email address or the email address linked to their hardware credential token. In response to receiving the identifying information, the computing device 102 sends a request for issuance of a software credential token to the authentication server 106 (202). The request for issuance of a software credential token can take any suitable form. The request for issuance of a software credential token can include an indication of the hardware credential token to which the request corresponds. The indication of a hardware credential token can be an indication of a user received via the user input into the computing device 102. In an example, the indication of a hardware credential token can be the e-mail address that corresponds to the hardware credential token.

The authentication server 106 can receive the request for a software credential token and attempt to authenticate a user corresponding to the computing device 102 in response thereto. Authenticating the user can include verifying that the hardware credential token identified in the request for issuance of a software credential token is (currently) valid. The key server 108 can store the current status (e.g., valid, revoked) of hardware credential tokens for accessing the data server 104. The key server 108 can also store information, such as an individual name, email address, and/or identification number linked to each hardware credential token.

To verify whether the indicated hardware credential token is valid, the authentication server 106 can send a request for information on the hardware credential token to the key server 108 (204). The authentication server 106 can include information identifying the hardware credential token (e.g., information from the request for issuance of a software credential token from the computing device 102) in the request. The indication of the hardware credential token can be in any suitable form, such as a name, identification number, email address, and/or other information identifying the user.

In an example, the request for information can include a request for status of the hardware credential token. The key server 108 can reply with an indication of the status of the hardware credential token (206). If the hardware credential token has been revoked, the key server 108 can reply with an indication of the revoked status and the authentication server 106 can terminate the authentication process and notify the computing device 102 that issuance of a software credential token has failed. If the hardware credential token is valid, the key server 108 can proceed to the next step for authenticating the user as described below.

In an example, the request for status of the hardware credential token can include a request for a public key corresponding to the hardware credential token. In an example, the key server 108 can store digital certificates corresponding to each hardware credential token/user, and each digital certificate can include a public key that is paired with the hardware credential token (e.g., the private key thereof). In such an example, the key server 108 can send the digital certificate to the authentication server in response to the request for a public key. In an example, the key server 108 can indicate that the hardware credential token is valid by sending the digital certificate corresponding thereto to the authentication server 106.

In some examples, as mentioned above, an email address linked to the hardware credential token can be received from the computing device 102 along with the request for issuance of a software credential token. In other examples, however, the request for status of the hardware credential token can include a request for an email address of the user. In such an example, the key server 108 can reply to the request from the authentication server 106 with the email address.

In response to receiving an indication that the hardware credential token is valid and, optionally, receiving other requested information for a user (e.g., the email address, the public key), the authentication server 106 can send an email with a one-time password therein to the email address linked to the hardware credential token (208). In an example, additional security is provided by encrypting the one-time password in the email sent to the hardware credential token's email address. The one-time password can be encrypted with the public key received from the key server 108, wherein the public key corresponds to the hardware credential token identified by the computing device 102. The entire email can be encrypted or only a subset of the email including the one-time password can be encrypted. In either case, since the one-time password is encrypted with the public key that is a pair with a hardware credential token for the identified user, the one-time password can only be decrypted with the corresponding hardware credential token.

Method 200 relies on the user possessing the hardware credential token to retrieve the message sent to the user's email address and decrypt the encrypted one-time password to verify that the user corresponding to the request for issuance of a software credential token is, in fact, present and controlling the computing device 102. In particular, after sending the one-time password to the email address, the authentication server 106 hinges issuance of a software credential token on reception of the one-time password from the computing device 102. In an example, the authentication server 106 sends a challenge to the computing device 102 for the one-time password. The email address to which the email is sent is the email address that is linked to the hardware credential token of the user.

If the user corresponding to the hardware credential token identified in the request for issuance of a software credential token is present, the user should be able to use their hardware credential token to access the email account to which the one-time password was sent. The user can then access the email to which the encrypted one-time password was sent, use the hardware credential token to decrypt the encrypted one-time password, manually read the one-time password (now in plaintext form), and input the password in plaintext form into the computing device 102. The computing device 102 (e.g., the app thereon) provides a mechanism (e.g., prompts, input field) in which the user can input the one-time password. In response to receiving an inputted password from the user, the computing device 102 can send the inputted password to the authentication server 106 (210). If the user corresponding to the hardware credential token is not present, or otherwise does not correspond to the computing device 102, the individual operating the computing device 102 will not be able to access the email address to obtain the one-time password, because that individual will not have access to, or otherwise be able to use, the user's hardware credential token. In examples where one or more second factors are required to use the hardware credential token, accessing the email address also involves inputting of the one or more second factors by the user in conjunction with their hardware credential token. The computing device 102 can send the password inputted therein to the authentication server 106 (210).

In response to receiving an inputted password from the computing device 102, the authentication server 106 compares the inputted password to the one-time password sent in the email. If the inputted password matches the one-time password sent in the email, user authentication for the computing device 102 is successful. In response to successful user authentication a software credential token is generated (212) and issued to the computing device 102 (214). If the inputted password received from the computing device 102 does not match the one-time password sent in the email, user authentication fails and no software credential token is issued. Each user having a valid hardware credential token can be issued a distinct software credential token by the authentication server 106 in this way.

The software credential token is an encrypted file that can be decrypted by the authentication server 106. The mobile device 102 of the user and other people in the general public cannot decrypt the software credential token. This provides integrity to the software credential token by making it difficult to modify. Generating the software credential token can include encoding the user identity and/or attributes into the software credential token, such that the user can be unambiguously identified by the software credential token. Generating the software credential token can also include providing integrity to the software credential token, such that fake software credential tokens are difficult to generate. Generating the software credential token can also include encoding one or more additional factors (e.g., something the user knows and/or something the user is) into the software credential token. In such an example, the computing device 102 can prompt a user for one or more additional factors to-be encoded in the software credential token and send the one or more additional factors to the authentication server 106 prior to generation of the software credential token. The authentication server 106 can then encode the one or more additional factors into the software credential token before sending the software credential token to the computing device 102. Any appropriate additional factor(s) can be used including, for example, a string of characters (e.g., PIN) and/or a biometric ID (e.g., eye scan, face scan, fingerprint).

In response to receiving the software credential token, the mobile device 102 can store the software credential token for use in accessing the data server 104 as described below. In an example the mobile device 102 can store the software credential token in a secondary storage device coupled thereto, such as a USB flash memory device.

The process 200 of issuing a software credential token discussed herein provides a secure way to issue a software credential token by relying on the security of a hardware credential token already issued to a user. In particular, because the one-time password is sent to an email address that can only be accessed via the hardware credential token, only the proper user in possession of the hardware credential token can access the one-time password. Thus, the assurance provided by the hardware credential token (requiring physical control thereof and, optionally, one or more additional factors) is used to authenticate the user of the computing device 102. Advantageously, by hinging issuance of the software credential token on the assurance provided by the hardware credential token, issuance of the software credential token meets the same level of assurance as accessing the data server 104 with the hardware credential token.

Moreover, relying on the already issued hardware credential token allows method 200 to avoid manual re-verification of the user before issuing the software credential token. For example, an initial verification of a user in the process of issuing a hardware credential token may require provision of identification information and/or identification documents (e.g., government issued IDs) with a manual review to ensure that an individual is allowed access to a particular online resource before issuing a key granting access to the online resource. The method 200 described herein does not require such manual verification. Instead, the method 200 relies on the assurance provided by the already issued hardware credential token to issue the software credential token to a user corresponding to the hardware credential token.

Additionally, the software credential token issuance process 200 discussed herein is convenient and comfortable for a user. The user merely inputs identifying information into the personal computing device 102, accesses their email account, and inputs the one-time password in the email from the authentication server 106.

In an example, the data server 104 is a government data server, such as a US Navy or US Department of Defense (DoD) server that stores personnel information of Navy personnel. The Navy personnel have a federal government email address, such as an email address ending in .mil. In such an example, each user given a .mil email address is issued a corresponding hardware credential token (e.g., a CAC or a PIV card). The hardware credential token is necessary for accessing encrypted email sent to the .mil email address. Thus, the authentication server 106 can rely on the security provided by the .mil email address and the hardware credential token to ensure that only the actual user corresponding to the particular .mil email address is authenticated for the computing device 102.

FIG. 3 is a message flow diagram of an example method 300 for using the software credential token to access data on the data server 104. Once the user is issued a software credential token via a computing device 102, the user can use that computing device 102 and software credential token to authenticate themselves for access to the data server 104. Notably, with a valid software credential token, the user can access the data server 104 via the app on the mobile device 102 without requiring use of their hardware credential token.

Use of the software credential token to access the data server 104 includes providing the software credential token to the authentication server 106 in a request for session authentication. Session authentication verifies that the computing device 102 has a valid software credential token and, optionally, that a user operating the computing device 102 knows or has the one or more additional factors encoded in the software credential token. Session authentication provides the computing device 102 with access to the data server 104 for limited length of time (a single "session").

Session authentication does not require a user to have or use their hardware credential token. Instead, session authentication relies on the robust assurance previously performed to issue the software credential token, and verifies authenticity based on that software credential token. By relying on the software credential token for session authentication, access to the data server 104 after issuance of a software credential token is quick. Moreover, the software credential token can be used by a computing device 102 to access the data server 104 over multiple sessions in which data on the data server 104 is accessed. Successful session authentication results in access to the data server 104 for a single session.

Session authentication begins with the computing device 102 providing its software credential token to the authentication server 106 (302). In examples where one or more additional factors are encoded into the software credential token, the computing device 102 can prompt a user for the one or more additional factors and send the one or more additional factors to the authentication server 106 as well. The authentication server 106 can inspect the software credential token to verify that it is still valid and provide session access for the computing device 102 to the data server 104 based thereon. Inspecting the software credential token can include decrypting the software credential token and checking if the one or more additional factors received from the computing device 102 match the one or more additional factors encoded in the software credential token (304). Verifying that the software credential token is still valid can include querying the key server 108 to verify that a user corresponding to the software credential token has not had their hardware credential token revoked (306). The key server 108 can send a response (308) to the query. If the user encoded in the software credential token has their credential revoked, the response (308) includes a notification to the authentication server 106 of the revoked access. If the user encoded in the software credential token has not had their credential revoked (i.e., the access is currently allowed), the response (308) includes a notification to the authentication server 106 of the non-revoked access.

If the authentication server 106 receives a notification of revoked access from the key server 108, or if the one or more additional factors sent by the computing device 102 do not match those in the software credential token, session authentication fails, and the authentication server 106 denies access to the data server 104 and notifies the computing device 102 thereof. If the software credential token is valid (e.g., not revoked) and the additional factor(s) provided by the computing device 102 match the additional factor(s) encoded in the software credential token, the authentication server 106 grants access to the data server 104 for a session. Granting access can include issuing an access token for the session to the computing device 102 (310). The access token is a software credential token that is configured such that it can be provided to the data server 104 such that the data server 104 can inspect the access token and grant/deny access thereto for a computing device 102 providing the access token. In an example, session authentication of the computing device 102 can be performed in accordance with an existing standard, such as OAuth standard implemented by the IETF OAuth Working Group. In an example, the access token can be an access token that conforms to the OAuth standard.

Granting access can include sending information to the data server 104 (e.g., an API thereof) to indicate which computing device 102 and/or access token has been granted access thereto. In an example, the computing device 102 can send the access token to the data server 104 (312). In response to receiving an access token, the data server 104 can verify the validity of the access token. Verifying the validity can include sending a query from the data server 104 to the authentication server 106 inquiring whether the access token is valid (314). The authentication server 106 can respond to the data server 104 indicating whether the access token is valid (316). The data server 104 responds (318) to the computing device's 102 presentation of the access token. If the data server 104 receives an indication from the authentication server 106 that the access token is not valid, the data server 104 denies access thereto to the computing device 102. If the data server 104 receives an indication from the authentication server 106 that the access token is valid, the data server 104 grants access thereto. Once access is granted, the computing device 102 can access data on the data server 104 to store, read, or update information as desired and as allowed by the user's access rights, if any. The data can include any appropriate data such as emails for the email account linked to the hardware credential token, organizational information, and other data.

After the single session, access to the data server 104 is revoked until the computing device 102 successfully completes another session authentication (method 300). Each session can be defined in any appropriate manner and would typically allow access for a long enough time period to complete the desired data retrieval and/or storage for a given user of the computing device 102. As in the example discussed above, access for each session can be controlled via issuance of an access token, secure cookie, or other software item to the computing device 102. That is, if the computing device 102 is successfully authenticated by the authentication server 106, the authentication server 106 can issue an access token, secure cookie, or other security software item to the computing device 102. The computing device 102 can provide the access token, cookie, or other software item to the data server 104 to authenticate therewith. Once authenticated with the data server 104, the computing device 102 can retrieve and store data to/from the data server 104 via an application programming interface (API). At the end of the data retrieval/store session, the access token, secure cookie, or other software item expires. The computing device 102 can obtain another access token, secure cookie, or other software item at a future time after successfully completing the session authentication again. In contrast to the access token, secure cookie, or other software item for session authentication, the software credential token is valid for longer than a single session, such that the software credential token can be used for multiple session authentications. In an example, the software credential token is a type that can be stored and used by the computing device 102 without use of a trusted store. In such an example, mobile device management (MDM) is not needed for use of the software credential token. By using a software credential token that does not require MDM, the user does not have to give up control of the mobile device to a third-party organization in order to use the software credential token. In an example, the software credential token is a JSON web Encryption (JWE) object. In an example, the access token is a JSON Web Token (JWT) object. In an example, one or both of the software credential token and the access token are held (stored) in a secondary storage device coupled to the mobile device 102.

Although in the examples described herein, issuance of the software credential token and session authentication (issuance of the access token) are performed with a common server(s), in other examples the authentication server 106 can be composed of distinct servers which individually (or in distinct sets) perform issuance of the software credential token and session authentication.

Figure 4:
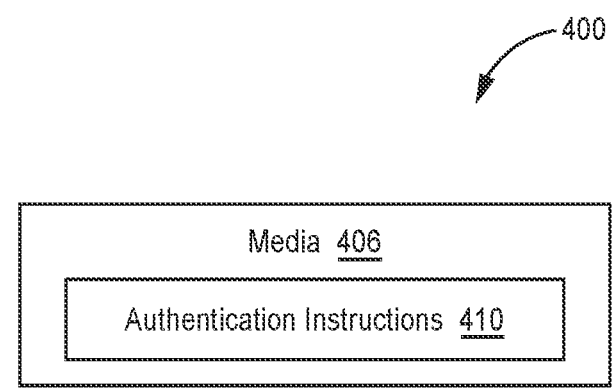
FIG. 4 is a block diagram of an example software module for implementing the authentication server of FIGS. 1 and 2.

FIG. 4 is a block diagram of an example software module 400 for loading onto a server to implement the authentication server 106. The software module 400 includes authentication instructions 410 that are stored or otherwise embodied on a computer readable medium 406. The authentication instructions 410 can be configured for loading onto a server, to enable the server to implement the functions of the authentication server 106 described herein. In an example, the computer readable medium 406 on which the authentication instructions 410 are stored can be standalone media, i.e., not coupled to any processing devices, memory, or other associated hardware. Example standalone media include optical media such as a compact disc (CD), digital video disk (DVD), or Blu-ray, and plug-in media such as a universal serial bus (USB) flash memory device). In another example, the computer readable medium 406 on which the authentication instructions 410 are stored can be part of a computing device configured to allow download of the authentication instructions 410 to a server over a network (e.g., the internet).

Figure 5:
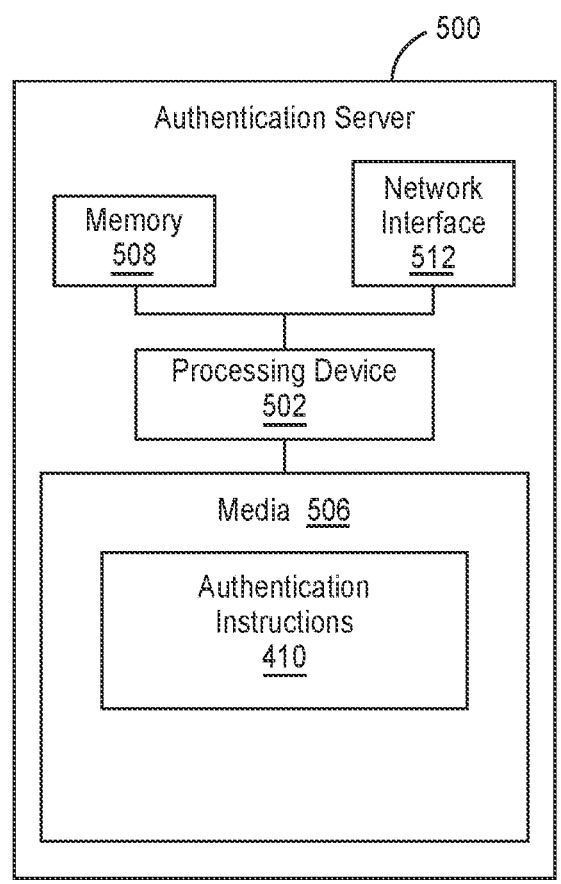
FIG. 5 is a block diagram of an example authentication server of FIGS. 1 and 2.

FIG. 5 is a block diagram of an example authentication server 500 having the authentication instructions 410 loaded therein. The authentication server 500 includes one or more processing devices 502 for executing the authentication instructions 410. The one or more processing devices 502 can include a general-purpose processor or a special purpose processor. The authentication instructions 410 are stored (or otherwise embodied) on or in an appropriate computer readable storage medium or media 506 from which the instructions 410 are readable by the processing device(s) 502 for execution thereby. The computer readable media 506 on which the authentication instructions 510 are stored can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. The authentication server 500 also includes memory 508 that is coupled to the processing device(s) 502 for storing instructions and related data during execution by the processing devices 502. Memory 508 comprises, in one implementation, any suitable form of random access memory (RAM) now know or later developed, such as dynamic random-access memory (DRAM). The authentication server 500 also includes one or more network interfaces 512, coupled to the one or more processing devices 502, for sending and receiving communications over a network. In other implementations, other types of memory are used. The authentication instructions 410, when executed by the one or more processing devices 502, cause the one or more processing devices 502 to perform the actions of the authentication server 106 described herein.

Figure 6:
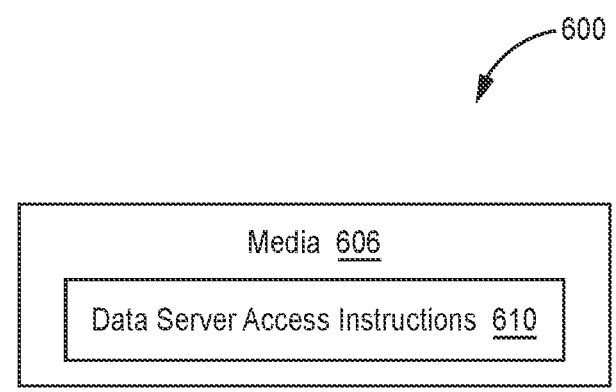
FIG. 6 is a block diagram of an example software module for implementing the user app of FIGS. 1 and 2.

FIG. 6 is a block diagram of an example software module 600 for loading onto a personal computing device to implement the functions of the computing device 102 described herein. The software module 600 can include a web browser add-in, a mobile application (app), or other software item. The software module includes data server access instructions 610 that are stored or otherwise embodied on a computer readable medium 606. The data server access instructions 610 can be configured for loading onto a personal computing device and, when executed by the computing device, can cause the computing device to implement the functions of the computing device 102 described herein. In an example, the computer readable medium 606 on which the data server access instructions 610 are stored can be standalone media, i.e., not coupled to any processing devices, memory, or other associated hardware. Example standalone media include optical media such as a compact disc (CD), digital video disk (DVD), or Blu-ray, and plug-in media such as a universal serial bus (USB) stick). In another example, the computer readable medium 606 on which the data server access instructions 610 are stored can be part of a server configured to allow download of the data server access instructions 610 to the personal computing device 102 over a network (e.g., the internet).

Figure 7:
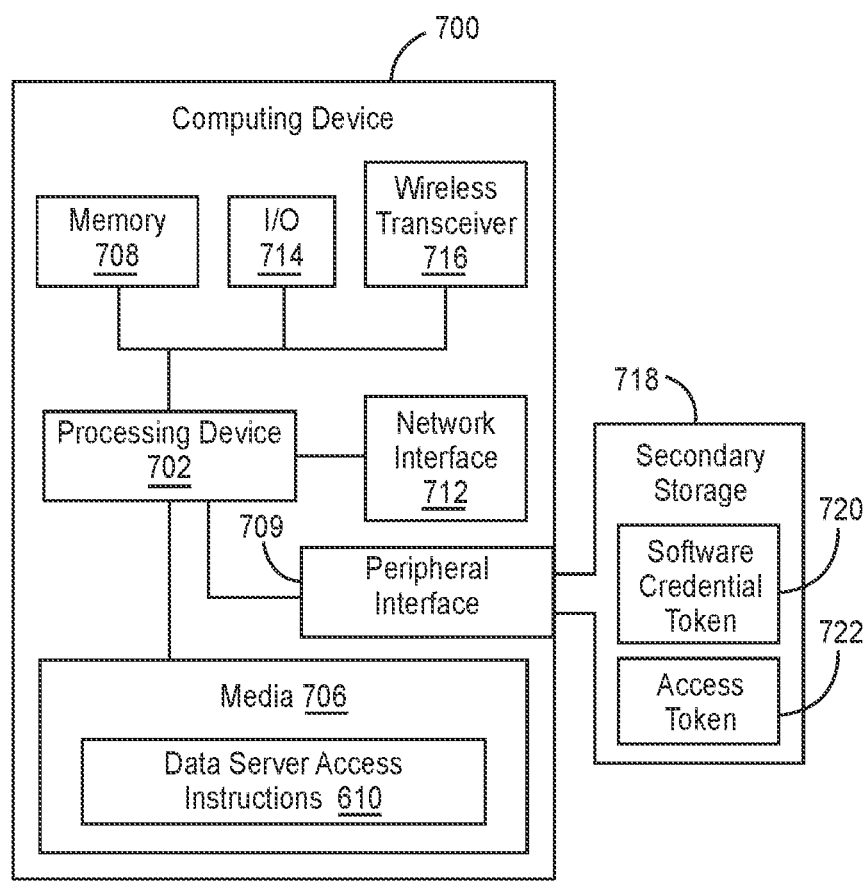
FIG. 7 is a block diagram of an example user device which executes the user app of FIGS. 1 and 2.

FIG. 7 is a block diagram of an example personal computing device 700 having the data server access instructions 610 loaded therein. The computing device 700 includes one or more processing devices 702 for executing the data server access instructions 610. The one or more processing devices 702 can include a general-purpose processor or a special purpose processor. The data server access instructions 610 are stored (or otherwise embodied) on or in an appropriate computer readable storage medium or media 706 from which the instructions 610 are readable by the processing device(s) 702 for execution thereby. The computer readable media 706 on which the data server access instructions 610 are stored can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. The computing device 700 also includes memory 708 that is coupled to the processing device(s) 702 for storing instructions and related data during execution by the processing devices 702. Memory 708 comprises, in one implementation, any suitable form of random access memory (RAM) now know or later developed, such as dynamic random-access memory (DRAM).

The mobile device 700 can also include one or more peripheral interfaces 709 for connecting of a secondary storage device 718. The peripheral interface(s) 709 can include a jack for connection with a connector of a secondary storage device 718. Example peripheral interfaces 709 include a universal serial bus (USB) interface, a firewire interface, a secure digital (SD) interface (e.g., SDSC, SDHC, SDXC, UHS). An example secondary storage device 718 is a USB flash memory device. The secondary storage device 718 is a distinct structure from the mobile device 700 that can be connected to and disconnected from mobile device 700 via the peripheral interface 709. The peripheral interface(s) 709 are coupled to the processing device(s) 702 such that while a secondary storage device 108 is coupled to the peripheral interface 718, the processing device(s) 702 of the computing device 700 can access data on the secondary storage device 718. The software credential token 720 and/or access token 722 issued to the mobile device 700 can be stored on the secondary storage device 718 and accessed by the processing device(s) 702 for use as described herein.

The computing device 700 can also include one or more input/output (I/O) devices 714 coupled to the one or more processing devices 702 for receiving input from, or providing input to, a user. The I/O device(s) 714 can include any suitable I/O device such as a keyboard, display screen, touchscreen, mouse, touchpad, microphone, etc. The computing device 700 can also include one or more network interfaces 712, coupled to the one or more processing devices 702, for sending and receiving communications over a network. The computing device 700 can also include one or more wireless transceivers 716, coupled to the one or more processing devices 702, for transmitting and receiving wireless signals. The data server access instructions 610, when executed by the one or more processing devices 702, cause the one or more processing devices 702 to perform the actions of the computing device 102 described herein.

What is claimed is:

1. A non-transitory computer readable medium comprising:
   a software module which, when executed by one or more processing devices, cause the one or more processing devices to:
   receive, at an authentication server from a computing device, a request for an encrypted electronic file encoding information that provides access to a restricted electronic resource, wherein the request includes an indication of a hardware credential token upon which the request relies, the hardware credential token one of a set of hardware credential tokens that provide access to the restricted electronic resource;
   obtain, at the authentication server, a public key corresponding to the hardware credential token;
   verify, at the authentication server, whether the hardware credential token is valid;
   send, from the authentication server to the computing device, a one-time password encrypted with the public key;
   receive an inputted password from the computing device; and
   in response to determining that the inputted password matches the one-time password, and the hardware credential token is valid, generating the encrypted electronic file and sending the encrypted electronic file to the computing device.

2. The non-transitory computer readable medium of claim 1, wherein the encrypted electronic file is a software credential.

3. The non-transitory computer readable medium of claim 1, wherein the software module, when executed by the one or more processing devices, causes the one or more processing devices to:
   receive, at the authentication server, the encrypted electronic file; and
   authenticate, based on the encrypted electronic file and without the hardware credential token, a user associated with the encrypted electronic file for access to the restricted electronic resource.

4. The non-transitory computer readable medium of claim 3, wherein in response to issuing the encrypted electronic file to the computing device, the encrypted electronic file is stored on a secondary storage device removably connected to the computing device.

5. The non-transitory computer readable medium of claim 4, wherein the secondary storage device is a USB flash memory device.

6. The non-transitory computer readable medium of claim 4, wherein receive a request for an encrypted electronic file includes receive a request at the authentication server from a first computing device, and receive the encrypted electronic file includes receive the encrypted electronic file at the authentication server from a second computing device, wherein the second computing device obtains the encrypted electronic file from the secondary storage medium which is removably coupled to the second computing device.

7. The non-transitory computer readable medium of claim 1, wherein the instructions cause the one or more processing devices to:
   receive, at the authentication server, one or more second factors to associate with the encrypted electronic file; and
   encode the one or more second factors into the encrypted electronic file, such that the one or more second factors can be used for authentication to the data server.

8. The non-transitory computer readable medium of claim 7, wherein the one or more second factors include one or more of something the user knows and something the user is.

9. The non-transitory computer readable medium of claim 8, wherein the one or more second factors include one or more of a string of characters and a biometric ID.

10. The non-transitory computer readable medium of claim 1, wherein the hardware credential token is one of a USB dongle, a smartcard, a SIM card, a universal integrated circuit card, or an SD card.

11. The non-transitory computer readable medium of claim 1, wherein the hardware credential token communicates with a computing device via one or more of near-field communication (NFC), Bluetooth, or physical connection with the computing device.

12. The non-transitory computer-readable medium of claim 1, wherein the restricted electronic resource is an online resource.

13. The non-transitory computer-readable medium of claim 1, wherein the computing device is a personal computing device that is not controlled by an organization associated with the authentication server.

14. A method comprising:
receiving, at an authentication server from a computing device, a request for an encrypted electronic file encoding information that provides access to a restricted electronic resource, wherein the request includes an indication of a hardware credential token upon which the request relies, the hardware credential token one of a set of hardware credential tokens that provide access to the restricted electronic resource;
obtaining, at the authentication server, a public key corresponding to the hardware credential token;
verifying, at the authentication server, whether the hardware credential token is valid;
sending, from the authentication server to the computing device, a one-time password encrypted with the public key;
receiving an inputted password from the computing device; and
in response to determining that the inputted password matches the one-time password, and the hardware credential token is valid, generating the encrypted electronic file and sending the encrypted electronic file to the computing device.

15. The method of claim 14, wherein the encrypted electronic file is a software credential.

16. The method of claim 14, comprising:
receiving, at the authentication server, the encrypted electronic file; and
authenticating, based on the encrypted electronic file and without the hardware credential token, a user associated with the encrypted electronic file for access to the restricted electronic resource.

17. The method of claim 16, wherein in response to issuing the encrypted electronic file to the computing device, the encrypted electronic file is stored on a secondary storage device removably connected to the computing device.

18. The method of claim 17, wherein the secondary storage device is a USB flash memory device.

19. The method of claim 17, wherein receive a request for an encrypted electronic file includes receive a request at the authentication server from a first computing device, and receive the encrypted electronic file includes receive the encrypted electronic file at the authentication server from a second computing device, wherein the second computing device obtains the encrypted electronic file from the secondary storage medium which is removably coupled to the second computing device.

20. The method of claim 14, comprising:
receiving, at the authentication server, one or more second factors to associate with the encrypted electronic file; and
encoding the one or more second factors into the encrypted electronic file, such that the one or more second factors can be used for authentication to the data server.

21. The method of claim 20, wherein the one or more second factors include one or more of something the user knows and something the user is.

22. The method of claim 21, wherein the one or more second factors include one or more of a string of characters and a biometric ID.

23. The method of claim 14, wherein the hardware credential token is one of a USB dongle, a smartcard, a SIM card, a universal integrated circuit card, or an SD card.

24. The method of claim 14, wherein the hardware credential token communicates with a computing device via one or more of near-field communication (NFC), Bluetooth, or physical connection with the computing device.

25. The method of claim 14, wherein the restricted electronic resource is an online resource.

26. The method of claim 14, wherein the computing device is a personal computing device that is not controlled by an organization associated with the authentication server.

* * * * *